(12) United States Patent
Takahashi

(10) Patent No.: US 10,593,123 B2
(45) Date of Patent: Mar. 17, 2020

(54) EDITING DEVICE FOR THREE-DIMENSIONAL SHAPE DATA, AND NON-TRANSITORY COMPUTER READABLE MEDIUM STORING THREE-DIMENSIONAL SHAPE-DATA EDITING PROGRAM

(71) Applicant: FUJI XEROX CO., LTD., Tokyo (JP)

(72) Inventor: Tomonari Takahashi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 19 days.

(21) Appl. No.: 15/890,796

(22) Filed: Feb. 7, 2018

(65) Prior Publication Data

US 2018/0342108 A1 Nov. 29, 2018

(30) Foreign Application Priority Data

May 24, 2017 (JP) .................................. 2017-102598

(51) Int. Cl.
 *G06T 19/20* (2011.01)
(52) U.S. Cl.
 CPC ...... *G06T 19/20* (2013.01); *G06T 2219/2012* (2013.01); *G06T 2219/2021* (2013.01)
(58) Field of Classification Search
 None
 See application file for complete search history.

(56) References Cited

U.S. PATENT DOCUMENTS

| | | | |
|---|---|---|---|
| 2017/0294032 A1* | 10/2017 | Mantuano | G06T 11/40 |
| 2017/0315697 A1* | 11/2017 | Jacobson | G06F 16/26 |
| 2018/0114368 A1* | 4/2018 | Marketsmueller | G06F 3/0482 |
| 2018/0276316 A1* | 9/2018 | Brochu | G06T 17/00 |

FOREIGN PATENT DOCUMENTS

| | | |
|---|---|---|
| JP | 2001-084395 A | 3/2001 |
| JP | 2004-102979 A | 4/2004 |
| JP | 2012-088771 A | 5/2012 |

OTHER PUBLICATIONS

Communication dated Aug. 31, 2018 from the European Patent Office in counterpart application No. 18160374.7.
Autodesk: "Gradient Ramp Map | 3ds Max | Autodesk Knowledge Network", 2016, pp. 1-12, XP055501478.
Mix: "Color Revit surface via gradient—Revit—Dynamo", 2017, pp. 1-8, XP055501738.

\* cited by examiner

*Primary Examiner* — Tize Ma
(74) *Attorney, Agent, or Firm* — Sughrue Mion, PLLC

(57) ABSTRACT

An editing device for three-dimensional shape data includes: a first setting part that sets at least one first characteristic point on three-dimensional shape data forming a three-dimensional shape; a second setting part that sets at least one second characteristic point on a predetermined distribution pattern, the at least one second characteristic point corresponding to the at least one first characteristic point set by the first setting part; and an assigning part that assigns an attribute to a three-dimensional range included in at least part of the three-dimensional shape in accordance with the distribution pattern so that the at least one first characteristic point set by the first setting part and the at least one second characteristic point set by the second setting part correspond to each other.

19 Claims, 15 Drawing Sheets

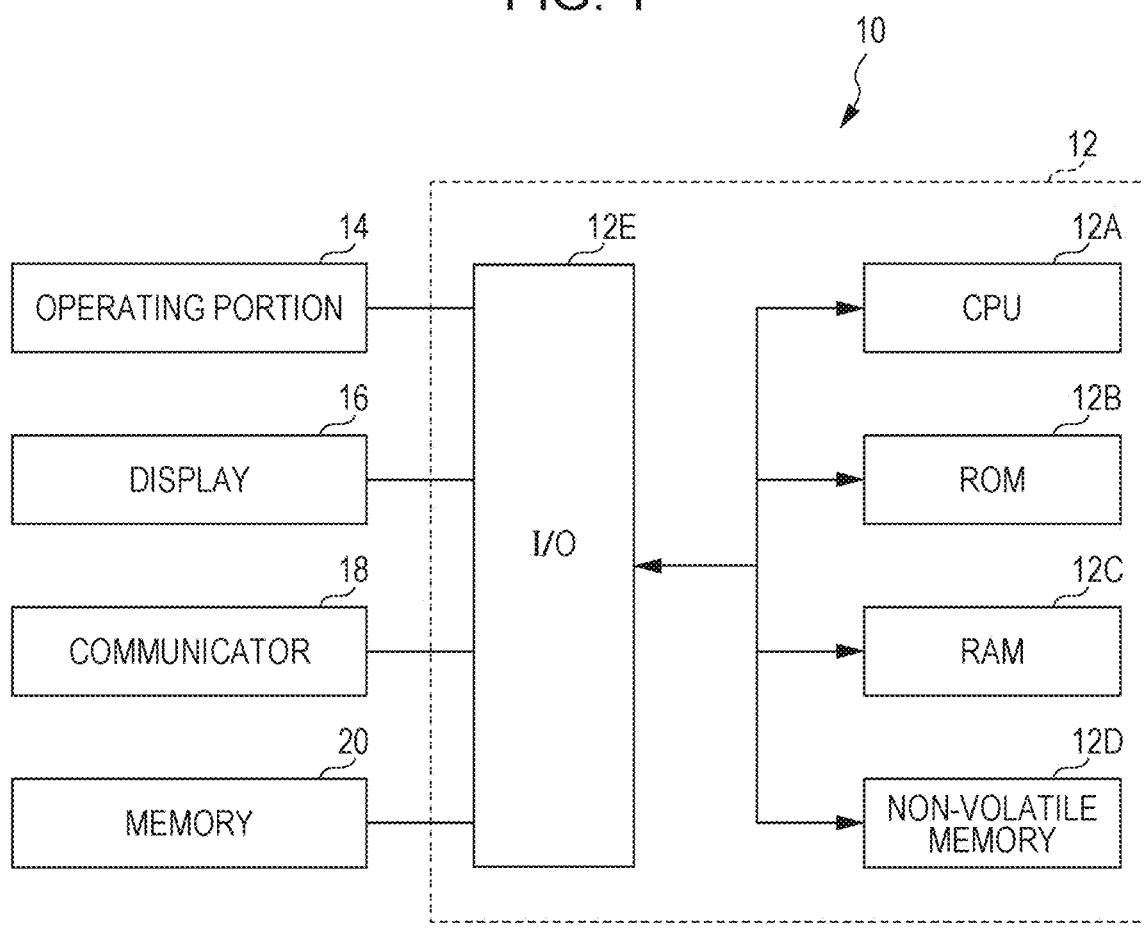

EDITING DEVICE FOR THREE-DIMENSIONAL SHAPE DATA, AND NON-TRANSITORY COMPUTER READABLE MEDIUM STORING THREE-DIMENSIONAL SHAPE-DATA EDITING PROGRAM

CROSS-REFERENCE TO RELATED APPLICATIONS

This application is based on and claims priority under 35 USC 119 from Japanese Patent Application No. 2017-102598 filed on May 24, 2017.

BACKGROUND

Technical Field

The present invention relates to an editing device for three-dimensional shape data, and a non-transitory computer readable medium storing a three-dimensional shape-data editing program.

SUMMARY

According to an aspect of the invention, there is provided an editing device for three-dimensional shape data including: a first setting part that sets at least one first characteristic point on three-dimensional shape data forming a three-dimensional shape; a second setting part that sets at least one second characteristic point on a predetermined distribution pattern, the at least one second characteristic point corresponding to the at least one first characteristic point set by the first setting part; and an assigning part that assigns an attribute to a three-dimensional range included in at least part of the three-dimensional shape in accordance with the distribution pattern so that the at least one first characteristic point set by the first setting part and the at least one second characteristic point set by the second setting part correspond to each other.

BRIEF DESCRIPTION OF THE DRAWINGS

Exemplary embodiments of the present invention will be described in detail based on the following figures, wherein:

FIG. 1 is a diagram illustrating a configuration example of an editing device;

DETAILED DESCRIPTION

Figure 2A:
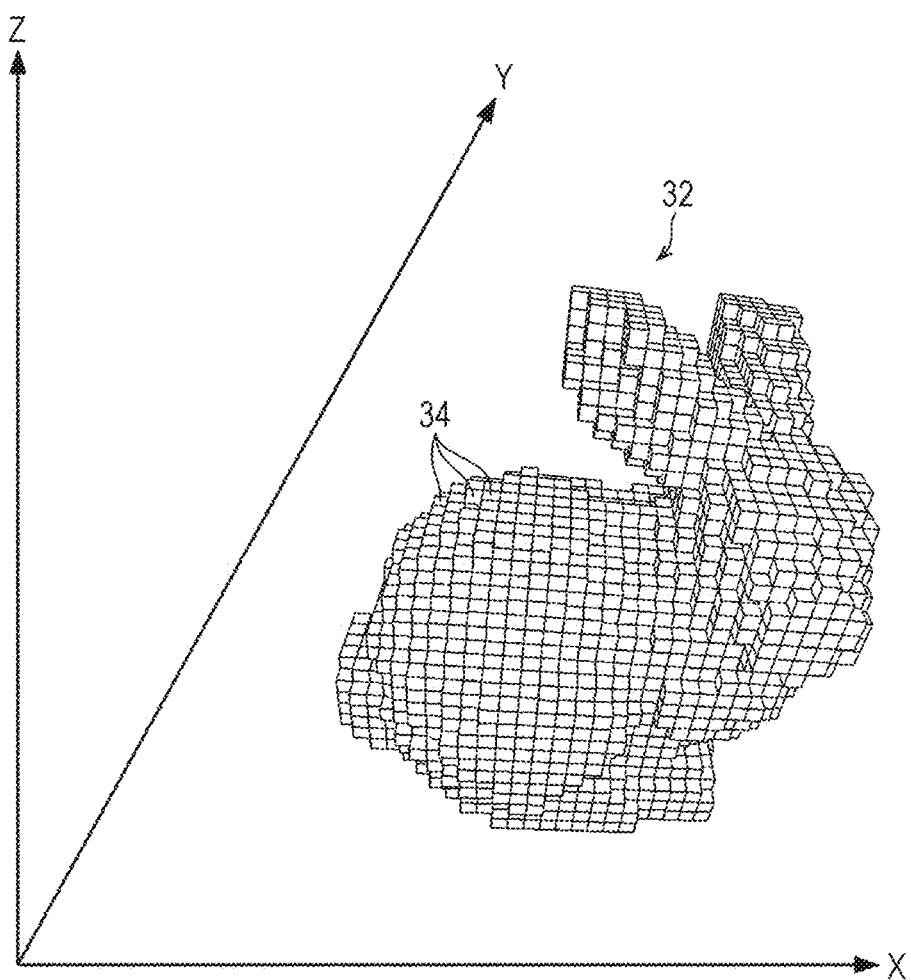
FIG. 2A is a figure illustrating an example of a three-dimensional shape.

Hereinafter, an exemplary embodiment for carrying out the present disclosure will be described in detail with reference to the drawings.

First, referring to FIG. 1, the configuration of an editing device 10 for three-dimensional shape data according to the exemplary embodiment will be described.

The editing device 10 is configured by, for instance, a personal computer, and includes a controller 12. The controller 12 includes a central processing unit (CPU) 12A, a read only memory (ROM) 12B, a random access memory (RAM) 12C, a non-volatile memory 12D, and an input/output (I/O) interface 12E. The CPU 12A, the ROM 12B, the RAM 12C, the non-volatile memory 12D, and the I/O 12E are connected to each other via a bus 12F.

Also, the I/O 12E is connected to an operating portion 14, a display 16, a communicator 18, and a memory 20. It is to be noted that the CPU 12A is an example of the first setting part, the second setting part, and the assigning part.

The operating portion 14 includes an input device such as, a mouse, a keyboard, or a touch panel, that receives an instruction from a user of the editing device 10, for instance.

The display 16 includes a display device, such as a liquid crystal display and an organic electro luminescence (EL) display, for instance.

The communicator 18 is connected to a communication line, for instance, the Internet or a local area network (LAN), and has an interface for performing data communication with an external device such as a personal computer connected to the communication line.

The memory 20 includes a non-volatile memory device such as a hard disk, and stores three-dimensional shape data and the like generated by the editing device 10.

Figure 2B:
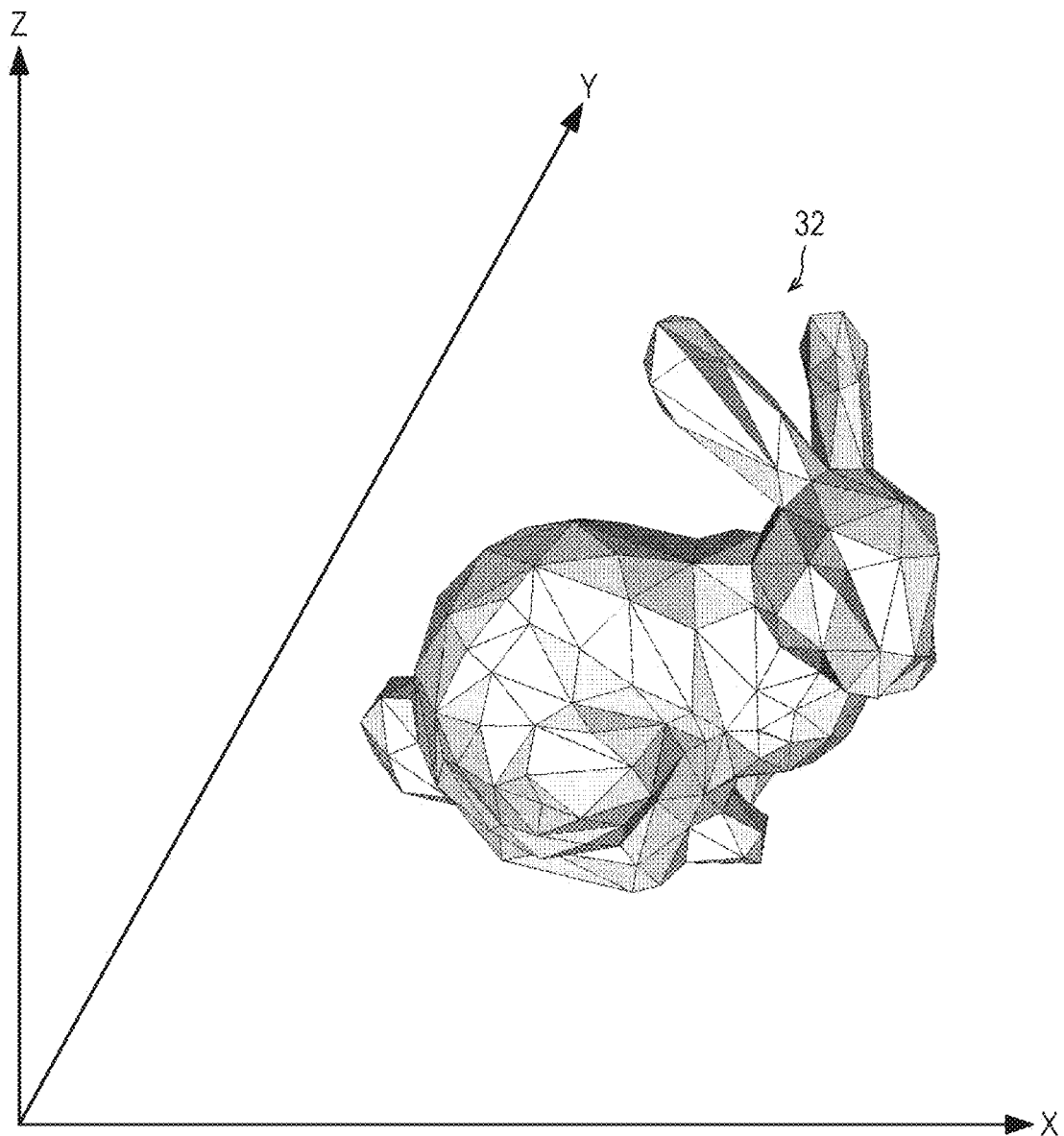
FIG. 2B is a figure illustrating an example of a three-dimensional shape.

FIGS. 2A and 2B are each a diagram illustrating an example of a three-dimensional shape 32 represented by three-dimensional shape data. As illustrated in FIGS. 2A and 2B, the editing device 10 expresses the three-dimensional shape 32 using three-dimensional coordinates (hereinafter referred to as a "three-dimensional coordinate space") formed by X-axis, Y-axis, and Z-axis. It is to be noted that FIG. 2A is an image of the three-dimensional shape 32 displayed with voxels, and FIG. 2B is an image of the three-dimensional shape 32 displayed with meshes.

Here, the voxels 34 are each a basic element of the three-dimensional shape 32, and for instance, a rectangular parallelepiped is used. However, without being limited to a rectangular parallelepiped, a sphere or a cylinder may be used. When the three-dimensional shape 32 is represented by the voxels 34, a desired three-dimensional shape 32 is represented by stacking the voxels 34. When the three-dimensional shape 32 is represented by the voxels 34, for each voxel 34, an attribute indicating a property of the voxel 34, for instance, a color, a material, a strength, a hardness, a material quality, a texture, an electrical conductivity, or a thermal conductivity is specified, and the color or the material of the three-dimensional shape 32 is represented by presence of the voxel 34 and the attribute of the voxel 34.

Here, the "material" includes at least one of information indicating a genre of material such as resin, metal, or rubber, information indicating a material name such as ABS, or PLA, information indicating a product name, and a product number of a commercially available material, information indicating a material such as a material name, an abbreviation, and a number which are defined in a standard such as ISO, or JIS, and information indicating material characteristics such as a thermal conductivity, an electrical conductivity, and magnetism.

Furthermore, the "texture" refers to an attribute indicating not only a color, but also appearance or touch of three-dimensional shape data, such as a reflectivity, a transmittance, gloss, and a surface property thereof.

It is to be noted that the attribute includes a distribution pattern which is set using at least one of a period, a mathematical expression, and another three-dimensional shape data. The distribution pattern includes at least one of repeat of a constant period, gradation, representation by a slope or a local point expressed by a mathematical expression, continuous modification of the color, material, or texture of three-dimensional shape data in accordance with another three-dimensional shape data, and filling or continuously modifying a specified range of three-dimensional shape data with a specified pattern.

As described above, the three-dimensional shape 32 is represented by a set of voxels 34, and specifically is represented by, for instance, an element value of X, Y, Z coordinates in a three-dimensional coordinate space. Let (X, Y, Z) represent coordinates in a three-dimensional coordinate space, then when a voxel 34 is present at the coordinates (X, Y, Z), "(X, Y, Z)=1" is set. On the other hand, when a voxel 34 is not present at the coordinates (X, Y, Z), the three-dimensional shape 32 is represented by setting "(X, Y, Z)=1". In other words, three-dimensional shape data includes the element value of the coordinates (X, Y, Z), which indicates the presence or absence of the voxel 34, and an attribute associated with the voxel 34 having an element value of "1".

It is to be noted that the three-dimensional shape 32 is not necessarily represented by coordinates (X, Y, Z) in a three-dimensional coordinate space. For instance, the three-dimensional shape 32 may be represented by index numbers each uniquely associated with coordinates (X, Y, Z). In this case, for instance when the value associated with an index number is "1", this means that a voxel 34 is present at the position indicated by the index number.

In addition, no restriction is imposed on the shape of the three-dimensional shape 32, and the three-dimensional shape 32 may be any shape as long as the shape is represented by using three-dimensional shape data.

Next, the operation of edit processing of three-dimensional shape data representing the three-dimensional shape 32 will be described.

Figure 3:
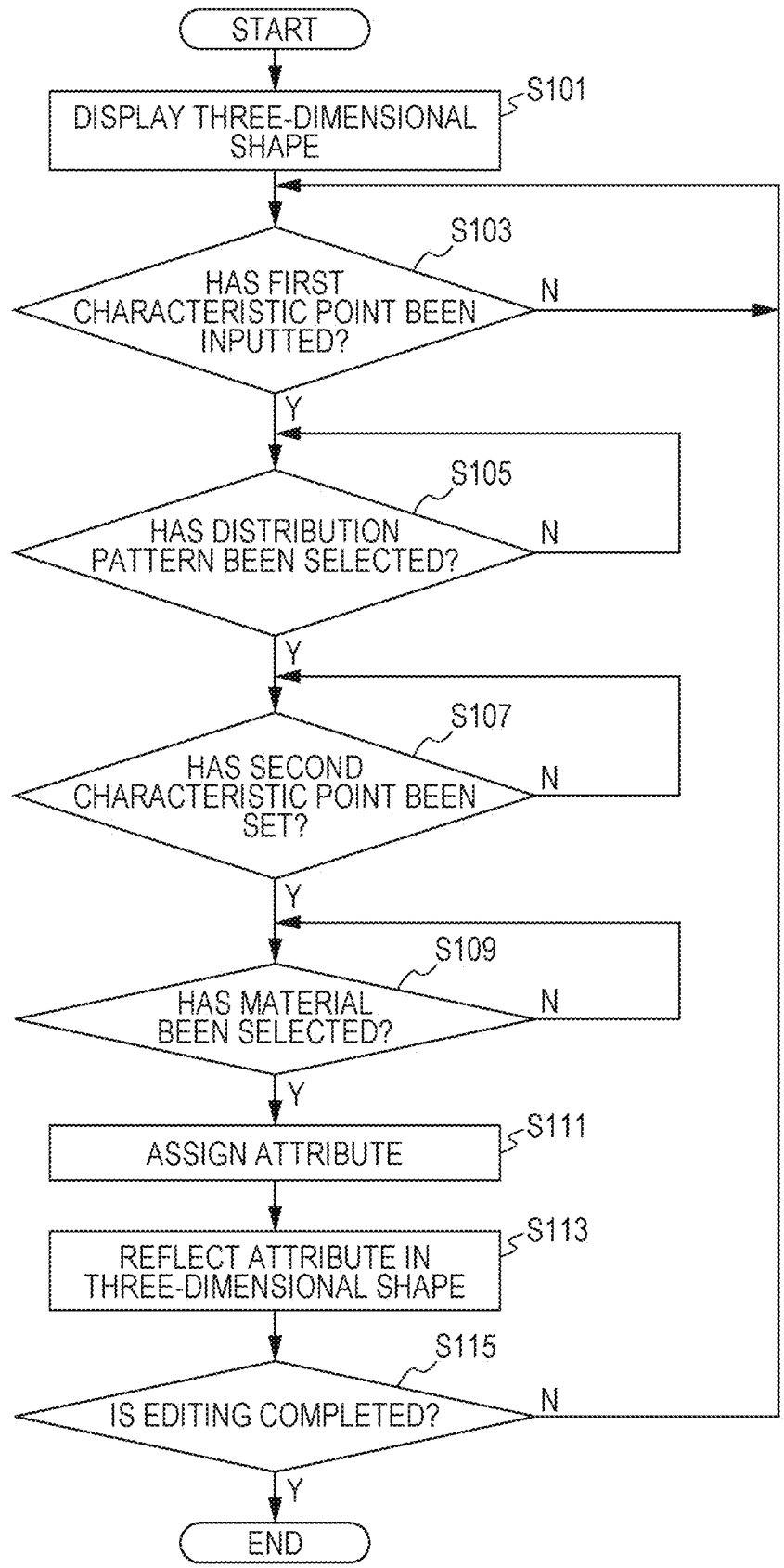
FIG. 3 is a flowchart illustrating an example of a flow of edit processing of three-dimensional shape data according to a first exemplary embodiment.

FIG. 3 is a flowchart illustrating an example of a flow of edit processing of three-dimensional shape data performed by the editing device 10. An editing program, which defines the edit processing of three-dimensional shape data, is pre-stored in the ROM 12B, and for instance, when receiving an edit start instruction for the three-dimensional shape 32 from a user, the CPU 12A reads the editing program from the ROM 12B and executes the editing program.

Figure 4:
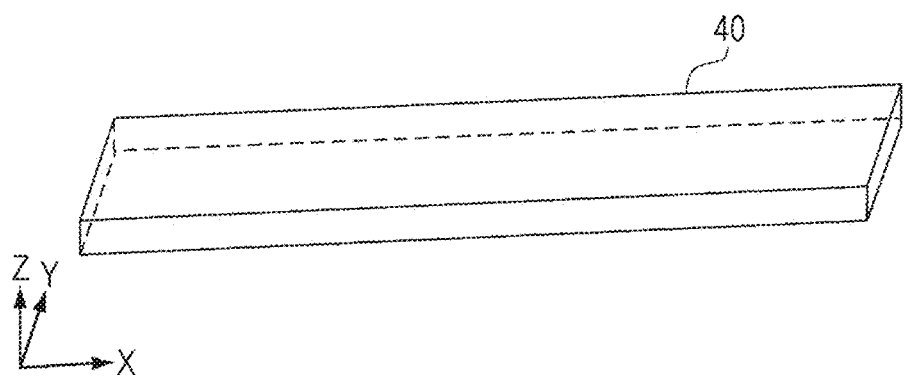
FIG. 4 is a figure illustrating an example of a three-dimensional shape.

In step S101, the CPU 12A performs control so that a three-dimensional shape to be edited is displayed on the display 16. Here, as an example, as illustrated in FIG. 4, in this exemplary embodiment, a case where the three-dimensional shape to be edited is a plate-like three-dimensional shape 40 will be described.

In the next step S103, the CPU 12A determines whether or not at least one first characteristic point on the three-dimensional shape 40 displayed on the display 16 has been inputted using the operating portion 14. It is to be noted that as the first characteristic point inputted in step S103, one of three-dimensional points configurating the three-dimensional shape may be used, or a new three-dimensional point for representing the first characteristic point may be added to any position in the three-dimensional space. The first characteristic point does not necessarily have to be inside the three-dimensional shape 40, and may be defined outside the three-dimensional shape 40. When the three-dimensional shape 40 is configured by multiple voxels, at least one voxel may be regarded as the first characteristic point.

Figure 5:
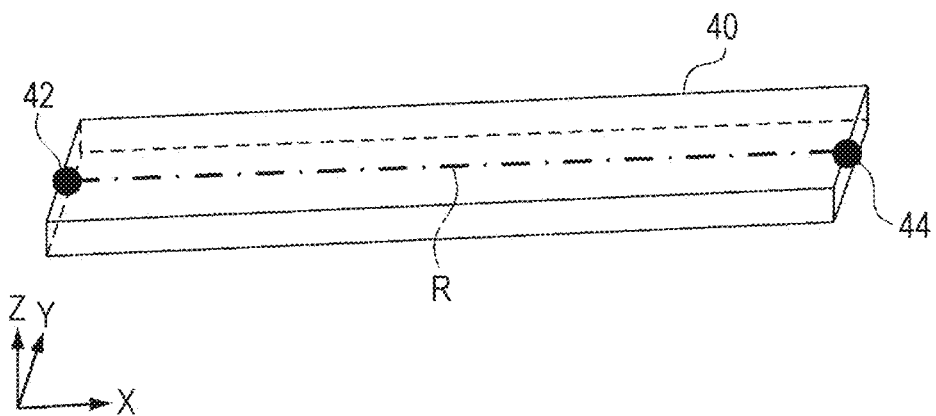
FIG. 5 is a figure illustrating an example of a characteristic point on a three-dimensional shape.

As an example, as illustrated in FIG. 5, in this exemplary embodiment, a case will be described where first characteristic points 42, 44 are selected, which are two points at both ends on the three-dimensional shape 40 serving as a start point and an end point, respectively.

In the next step S105, the CPU 12A determines whether or not a distribution pattern to be applied to the three-dimensional shape 40 displayed on the display 16 has been selected.

It is to be noted that in this exemplary embodiment, information indicating multiple distribution patterns is pre-stored in the memory 20, and in this step, each of the multiple distribution patterns is displayed on the display 16 in a selectable manner. A user selects one of the multiple distribution patterns displayed on the display 16 via the operating portion 14. The CPU 12A then obtains information indicating the distribution pattern selected by a user.

A distribution pattern is such that a distribution of at least two types of different attributes is expressed in terms of a parameter, such as an amplitude, a frequency, a wavelength, and a period, or a mathematical expression. In addition to a typical distribution pattern, any pattern defined by a user may be used. Also, when a three-dimensional shape is configured by multiple voxels, a distribution pattern may be defined by the arrangement of the voxels to which different attributes are set. In this case, when a distribution pattern defined by the arrangement of voxels is used, a distribution pattern formed by multiple voxels may be stored as three-dimensional data for storing the distribution pattern, and the stored distribution pattern may be used.

Figure 6:
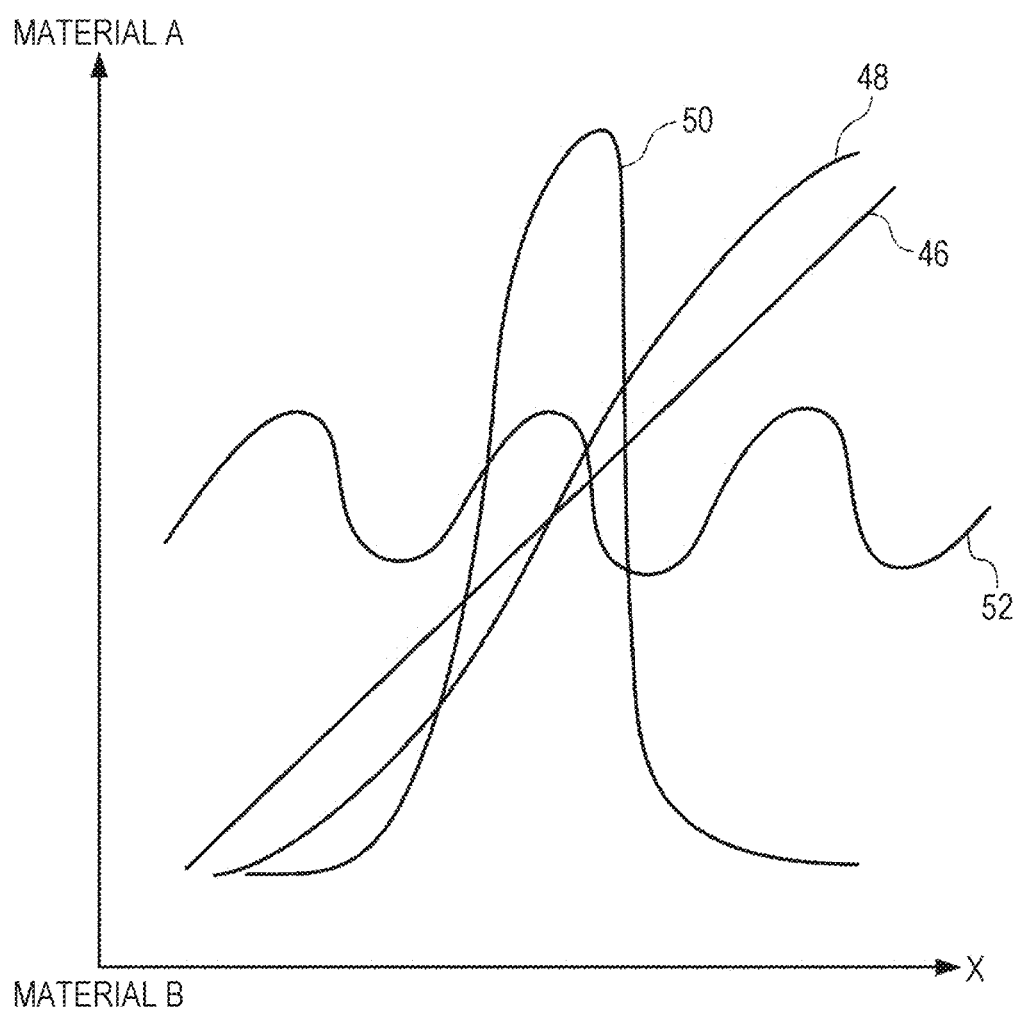
FIG. 6 is a graph illustrating an example of a distribution pattern of materials of which a three-dimensional shape is composed.
Figure 7:
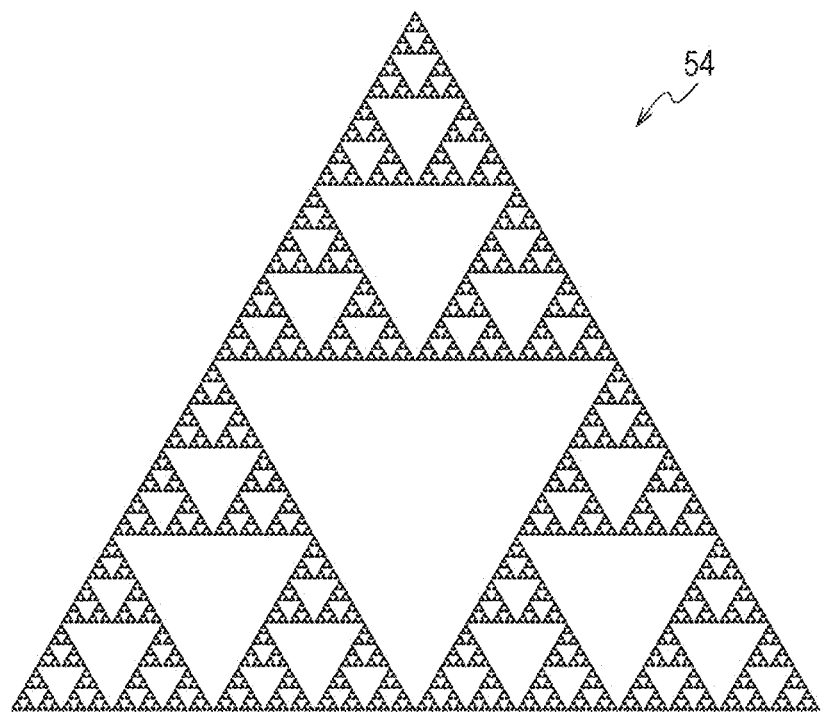
FIG. 7 is a diagram illustrating another example of a distribution pattern of material of which a three-dimensional shape is composed.
Figure 8:
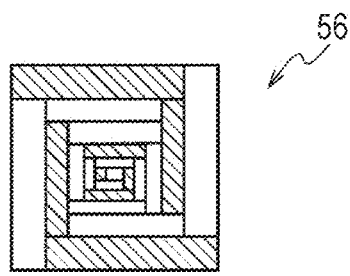
FIG. 8 is a diagram illustrating another example of a distribution pattern of materials of which a three-dimensional shape is composed.

As an example, as illustrated in FIGS. 6 and 7, typical distribution patterns include a linear function 46, a sigmoid function 48, a Gaussian function 50, a sine function 52, and a fractal 54. Alternatively, as an example, as illustrated in FIG. 8, a distribution pattern 56 specified by a user via the operating portion 14 may be used.

Figure 9:
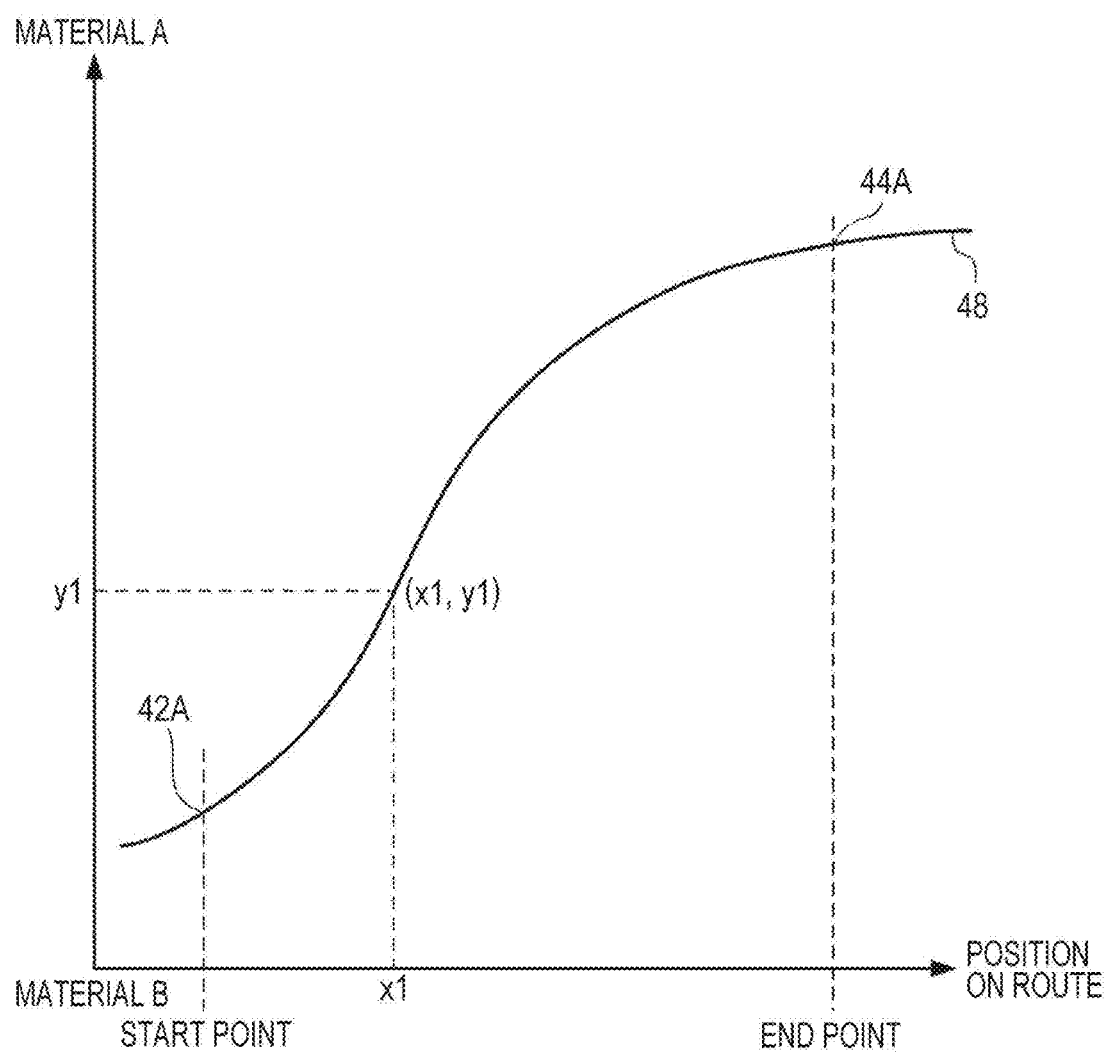
FIG. 9 is a graph illustrating a distribution pattern (sigmoid function) of materials of which a three-dimensional shape is composed.

In this exemplary embodiment, as an example, as illustrated in FIG. 9, a case where the sigmoid function 48 is selected will be described.

When it is determined that a distribution pattern has been selected in step S105 (Y in S105), the flow proceeds to step S107. When it is determined that a distribution pattern has not been selected in step S105 (N in S105), step S105 is repeated until a distribution pattern is selected.

In step S107, the CPU 12A determines whether or not second characteristic points on the selected distribution pattern, the second characteristic points corresponding to the first characteristic points 42, 44 on the three-dimensional shape 40. In this exemplary embodiment, as an example, as illustrated in FIG. 9, second characteristic points 42A, 44A corresponding to the first characteristic points 42, 44 of the three-dimensional shape 40 are set on the sigmoid function 48 which is the selected distribution pattern.

In this exemplary embodiment, a case where a user sets the second characteristic points 42A, 44A on the distribution pattern using the operating portion 14 will be described, however, without being limited to this, as a method of setting the second characteristic points 42A, 44A, the CPU 12A may set the positions and the distances of the characteristic points 42A, 44A on a distribution pattern so that those positions and distances correspond to the positions and the distances of the characteristic points 42A, 44A of the three-dimensional shape 40.

When it is determined that the second characteristic points 42A, 44A have been set in step S107 (Y in S107), the flow proceeds to step S109. When it is determined that the second characteristic points 42A, 44A have not been set in step S107 (N in S107), step S107 is repeated until the second characteristic points 42A, 44A are set.

In step S109, the CPU 12A determines whether or not each of materials in the distribution pattern has been selected. In this exemplary embodiment, as an example, material A and material B in a distribution pattern indicating a mixing ratio of each of the materials A, B illustrated in FIG. 9 are selected.

It is to be noted that in this exemplary embodiment, information indicating multiple materials is pre-stored in the memory 20, and in step S109, each of the multiple materials is displayed on the display 16 in a selectable manner. A user selects the material A and the material B via the operating portion 14 from the multiple materials displayed on the display 16. The CPU 12A then obtains information indicating the material A and material B selected by a user.

Also, in this exemplary embodiment, a case where materials are selected by a user will be described, however, without being limited to this, for instance, at least one of a color, a material, a strength, a hardness, a material quality, a texture, an electrical conductivity, and a thermal conductivity which are to be assigned to three-dimensional position information may be selected by a user.

When it is determined that materials have been selected in step S109 (Y in S109), the flow proceeds to step S111. When it is determined that materials have not been selected in step S109 (N in S109), step S109 is repeated until materials are selected.

In step S111, the CPU 12A assigns an attribute to a three-dimensional range which is part of and included in the three-dimensional shape 40 according to the inputted first characteristic points 42, 44, the set second characteristic points 42A, 44A, the selected distribution pattern, and the selected materials. In this process, the CPU 12A changes the distribution pattern of attributes assigned to the three-dimensional range by performing at least one of processing of changing the parameter of the distribution pattern, processing of changing the positions of the second characteristic points 42A, 44A on the distribution pattern, and processing of changing the positions of the first characteristic points 42, 44 on the three-dimensional shape 40, corresponding to the positions of the second characteristic points 42A, 44A on the distribution pattern.

Figure 2D:
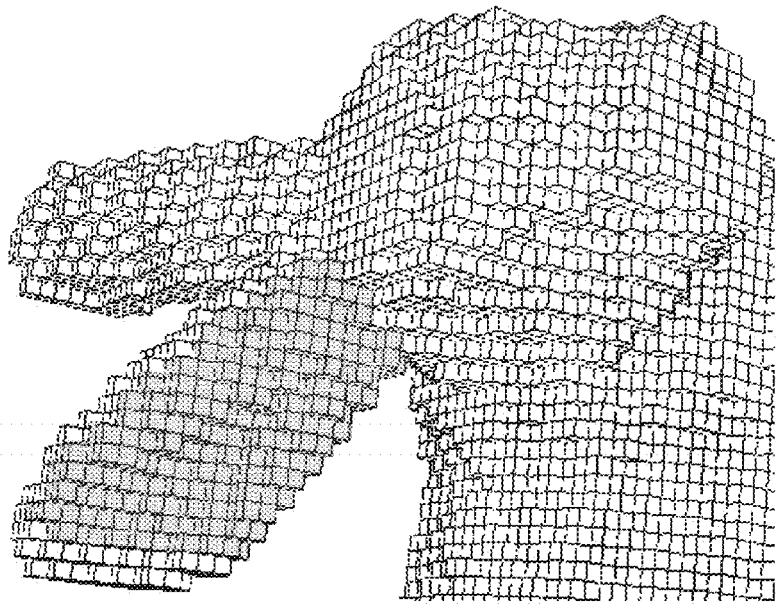
FIG. 2D is a figure illustrating another example of a range for defining a three-dimensional range.
Figure 2C:
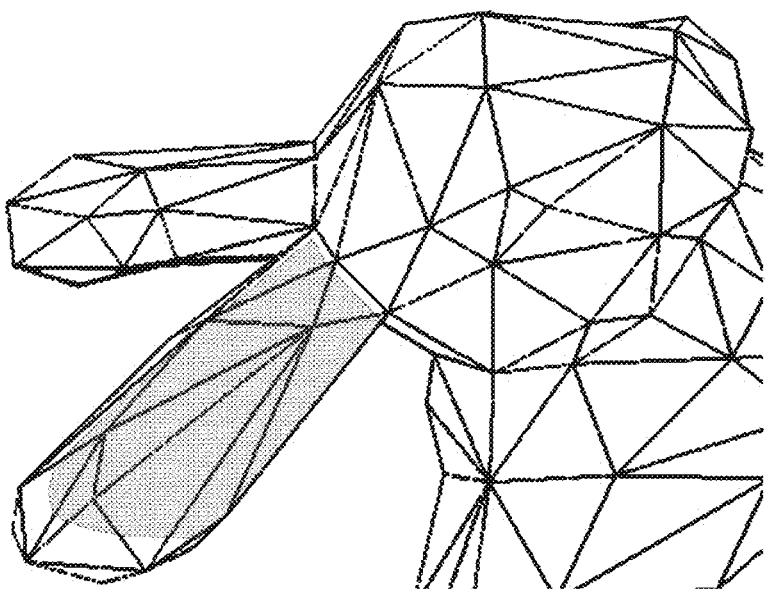
FIG. 2C is a figure illustrating an example of a range for defining a three-dimensional range.

The three-dimensional range referred to here is a limited region included in the three-dimensional shape 40, and is a three-dimensional range to which an attribute is to be assigned. For instance, when a three-dimensional shape of a rabbit is taken as an example, the three-dimensional range refers to, for instance, a range from the base of the ear to within 2 cm of the tip of the ear (see FIG. 2C), and the range is included in the front surface of the ear and within 5 mm of the boundary between the front and back surfaces of the ear (see FIG. 2D).

When a three-dimensional shape is configured by multiple voxels, in step S111, the CPU 12A assigns an attribute to each voxel 34 included in the three-dimensional shape 40 according to the inputted first characteristic points 42, 44, the set second characteristic points 42A, 44A, the selected distribution pattern, and the selected materials. In this assignment, the CPU 12A assigns an attribute to each voxel 34 by performing at least one of processing of changing the parameter of the distribution pattern, processing of changing the positions of the second characteristic points 42A, 44A on the distribution pattern, and processing of changing the positions of the first characteristic points 42, 44 on the three-dimensional shape 40, corresponding to the positions of the second characteristic points 42A, 44A on the distribution pattern.

Also, in this exemplary embodiment, an attribute is assigned to each of voxels 34 along a route R including multiple first characteristic points 42, 44 so that the first characteristic points 42, 44 on the three-dimensional shape 40 and the second characteristic points 42A, 44A on the distribution pattern correspond to each other. When the three-dimensional shape 40 is configured by multiple voxels, an attribute is assigned to each of voxels 34 on the route R including the multiple first characteristic points 42, 44 so that the first characteristic points 42, 44 on the three-dimensional shape 40 and the second characteristic points 42A, 44A on the distribution pattern correspond to each other.

Here, when a distribution pattern is applied to a three-dimensional range which is at least part of and included in the three-dimensional shape 40, the same distribution pattern may be applied to the depth of material 1 set in a depth direction according to a pattern in which the material 1 increases or decreases in quantity on a route including the first characteristic points 42, 44. Alternatively, a distribution pattern in a depth direction may be separately specified, or another distribution pattern in a depth direction is specified and a second characteristic point on the distribution pattern in the depth direction may be separately specified.

Also, since a distribution pattern to be applied defines the distribution of attributes of a three-dimensional shape, it is desirable to control attribute setting so that an attribute is set only in three-dimensional shape data, and an attribute is not set outwardly of the three-dimensional shape from the boundary of the surface of the three-dimensional shape. Specifically, when the first characteristic points 42, 44 are set outwardly of the three-dimensional shape 40, out of the distribution patterns on the route R including the first characteristic points 42, 44, only a distribution pattern at a portion corresponding to the inside of the three-dimensional shape 40 is desirably set as an attribute of the three-dimensional shape 40. However, setting an attribute outwardly of the three-dimensional shape 40 is not restriction.

Figure 10:
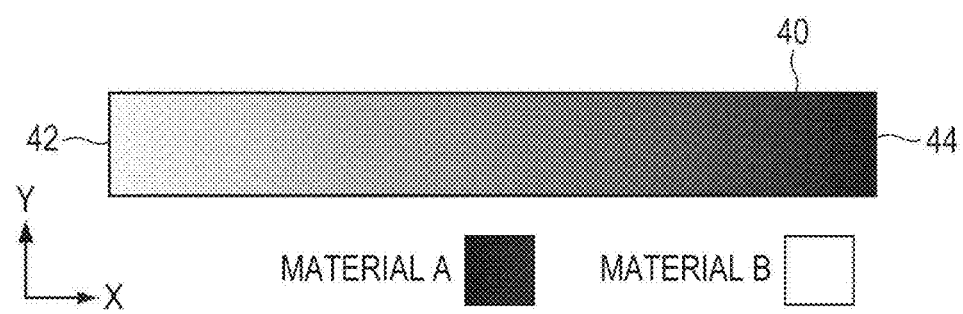
FIG. 10 is a figure illustrating an example of a state in which a distribution pattern of materials is applied to a three-dimensional shape.

In the next step S113, the CPU 12A reflects updated attribute information to the three-dimensional shape 40 displayed on the display 16, and displays the three-dimensional shape 40. As an example as illustrated in FIG. 10, the distribution of each material according to a distribution pattern is overlapped and displayed on the three-dimensional shape 40.

In this display, as an example as illustrated in FIG. 9, the position on the route is determined based on the value of x1 in coordinates (x1, y1) on the sigmoid function 48, and a mixing ratio of each of the material A and the material B is determined based on the value of y1.

Figure 11:
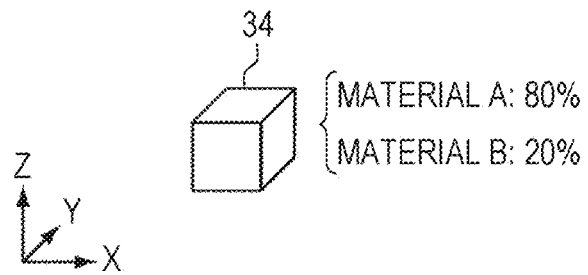
FIG. 11 is a figure illustrating an example of a mixing method used when materials are mixed into a three-dimensional shape according to a mixing ratio.
Figure 12:
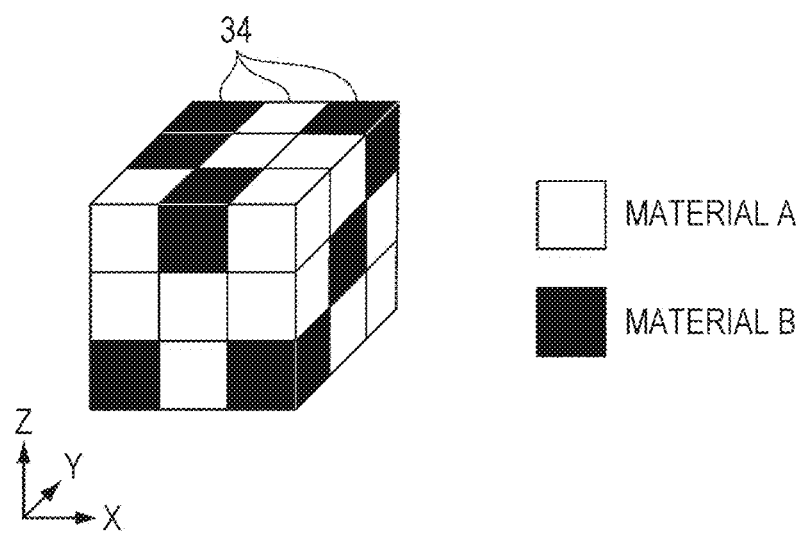
FIG. 12 is a figure illustrating another example of a mixing method used when materials are mixed into a three-dimensional shape according to a mixing ratio.

When a three-dimensional shape is configured by multiple voxels, methods of accurately expressing a mixture of multiple materials include two types of methods (A) and (B) as follows:
(A) In each voxel 34, a mixing ratio of each of the materials is specified. As an example, as illustrated in FIG. 11, in a voxel 34, a mixing ratio of 80% is specified for the material A, and a mixing ratio of 20% is specified for the material B.
(B) In the multiple voxels 34 included in a predetermined region in the three-dimensional shape 40, each material is assigned to a certain number of voxels 34, the certain number according to the ratio of the material. As an example, as illustrated in FIG. 12, when the material A is desired to be approximately 80% and the material B is desired to be approximately 20%, out of 27 voxels 34 included in a cube with each side of three voxels 34, the material A is used for 22 voxels 34 and the material B is used for 5 voxels 34, for instance.

In step S115, the CPU 12A determines whether or not editing is completed by determining whether or not information for instructing completion has been inputted via the operating portion 14. When it is determined that editing is completed in step S115 (Y in S115), execution of the program of the edit processing is completed. When it is determined that editing is not completed in step S115 (N in S115), the flow returns to step S103, and the processing in step S103 to S115 is performed again.

In this manner, the editing device 10 sets at least one first characteristic point on the three-dimensional shape data included in the three-dimensional shape 40, and sets at least one second characteristic point on a predetermined distribution pattern, corresponding to the set first characteristic point. In addition, the editing device 10 assigns an attribute to a three-dimensional range included in at least part of the three-dimensional shape 40 in accordance with the distribution pattern so that the set first characteristic points 42, 44 and the set second characteristic points 42A, 44A correspond to each other.

Figure 13:
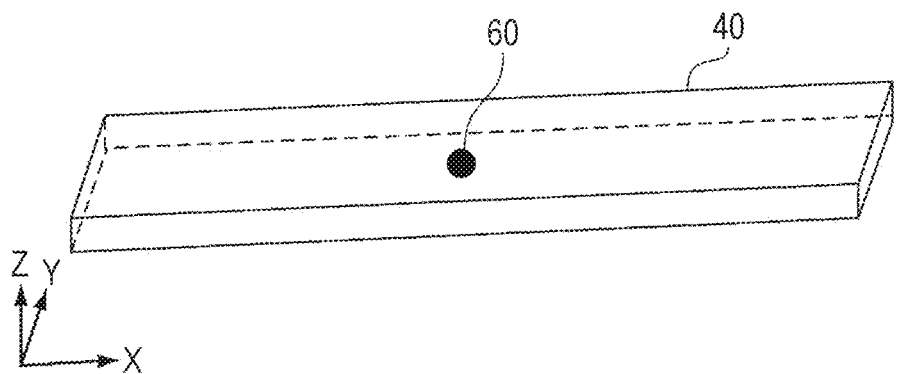
FIG. 13 is a figure illustrating another example of a characteristic point on a three-dimensional shape.
Figure 14:
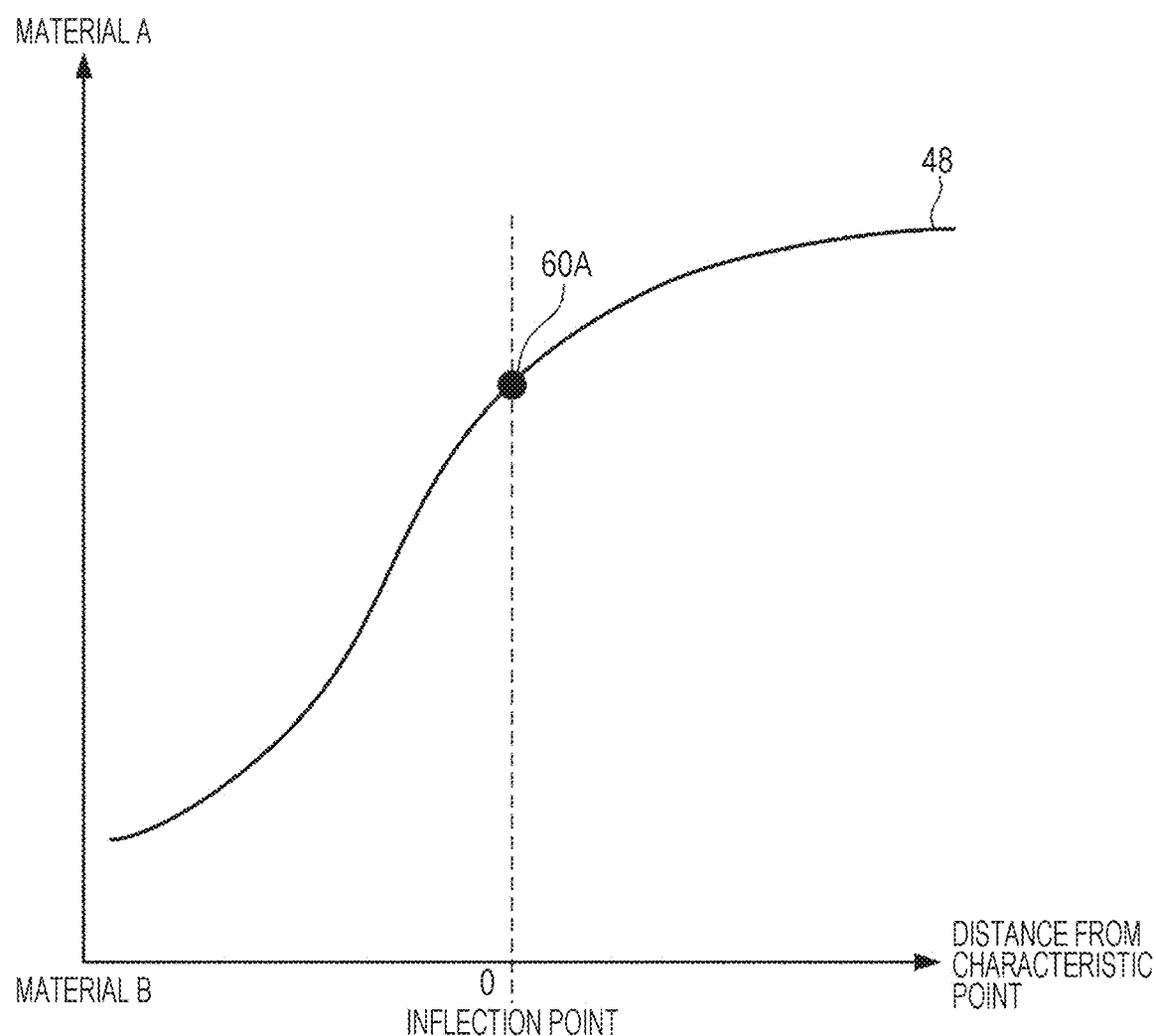
FIG. 14 is a graph illustrating another example of a distribution pattern (sigmoid function) of material of which a three-dimensional shape is composed.

It is to be noted that in this exemplary embodiment, a case where the two first characteristic points 42, 44 are inputted to the three-dimensional shape 40 has been described, however, the exemplary embodiment is not limited to this. As an example, as illustrated in FIG. 13, it is assumed that one first characteristic point 60 indicating an inflection point on the three-dimensional shape 40 is inputted, and as an example, as illustrated in FIG. 14, the sigmoid function 48 is selected, and a second characteristic point 60A on the sigmoid function 48, corresponding to the first characteristic point 60 on the three-dimensional shape 40 is set. In this case, when a start point and an end point of the sigmoid function 48, or the slope of the sigmoid function 48 is pre-set, a distribution pattern of materials in the three-dimensional shape 40 is identified.

Also, in this exemplary embodiment, a case where the mixing ratio of the material A has a larger value at a position closer to an axial upper end, and the mixing ratio of the material B has a larger value at a position closer to an axial lower end has been described, however, without being limited to this, for instance, the positive direction of one axis may represent the mixing ratio of the material A, the negative direction of the one axis may represent the mixing ratio of the material B, and the material may be switched to the other at a middle (here, the origin) of the axis.

Figure 15:
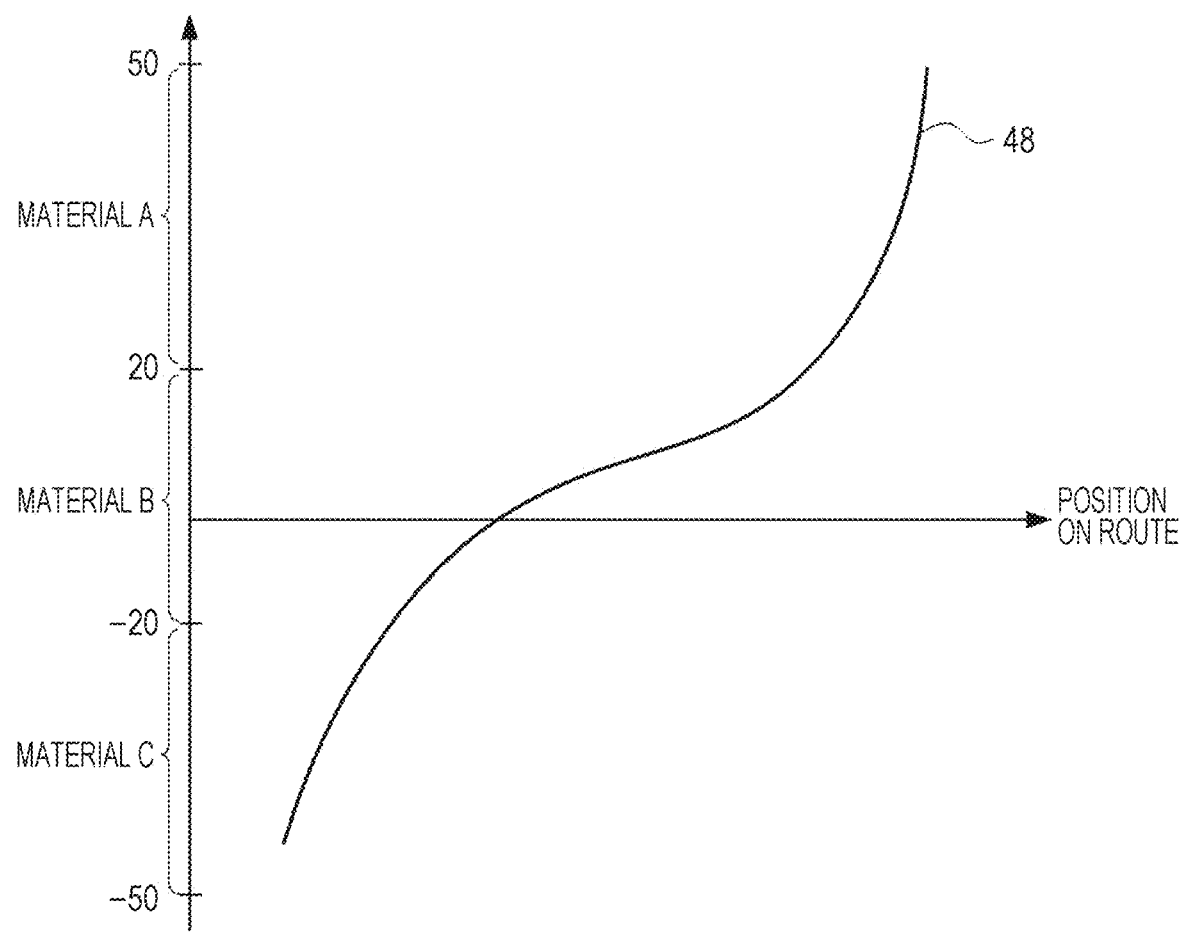
FIG. 15 is a graph illustrating an example of a distribution pattern of materials when a three-dimensional shape is composed of three or more types of materials.

Alternatively, as an example, as illustrated in FIG. 15, the range from +20 to +50 may indicate the material A, the range from −20 to +20 may indicate the material B, the range from −50 to −20 on the axis may indicate material C, and the material may be switched to the other at a boundary between ranges.

Also, for instance, at least one of a start point, an end point, and an inflection point on the three-dimensional shape 40 is inputted by pre-setting the start point, the end point, and the inflection point on the distribution pattern, thereby setting a second characteristic point on the distribution pattern from the pre-set start point, end point, and inflection point on the distribution pattern. Alternatively, along with the setting of the second characteristic point on the distribution pattern, a parameter, such as a slope, or an intercept of the distribution pattern may be set.

Also, in this exemplary embodiment, a case where the distribution pattern is edited so that the three-dimensional shape 40 is composed of two types of materials has been described, however, without being limited to this, a distribution pattern, in which the three-dimensional shape 40 is composed of three or more types of materials, may be edited.

Figure 16:
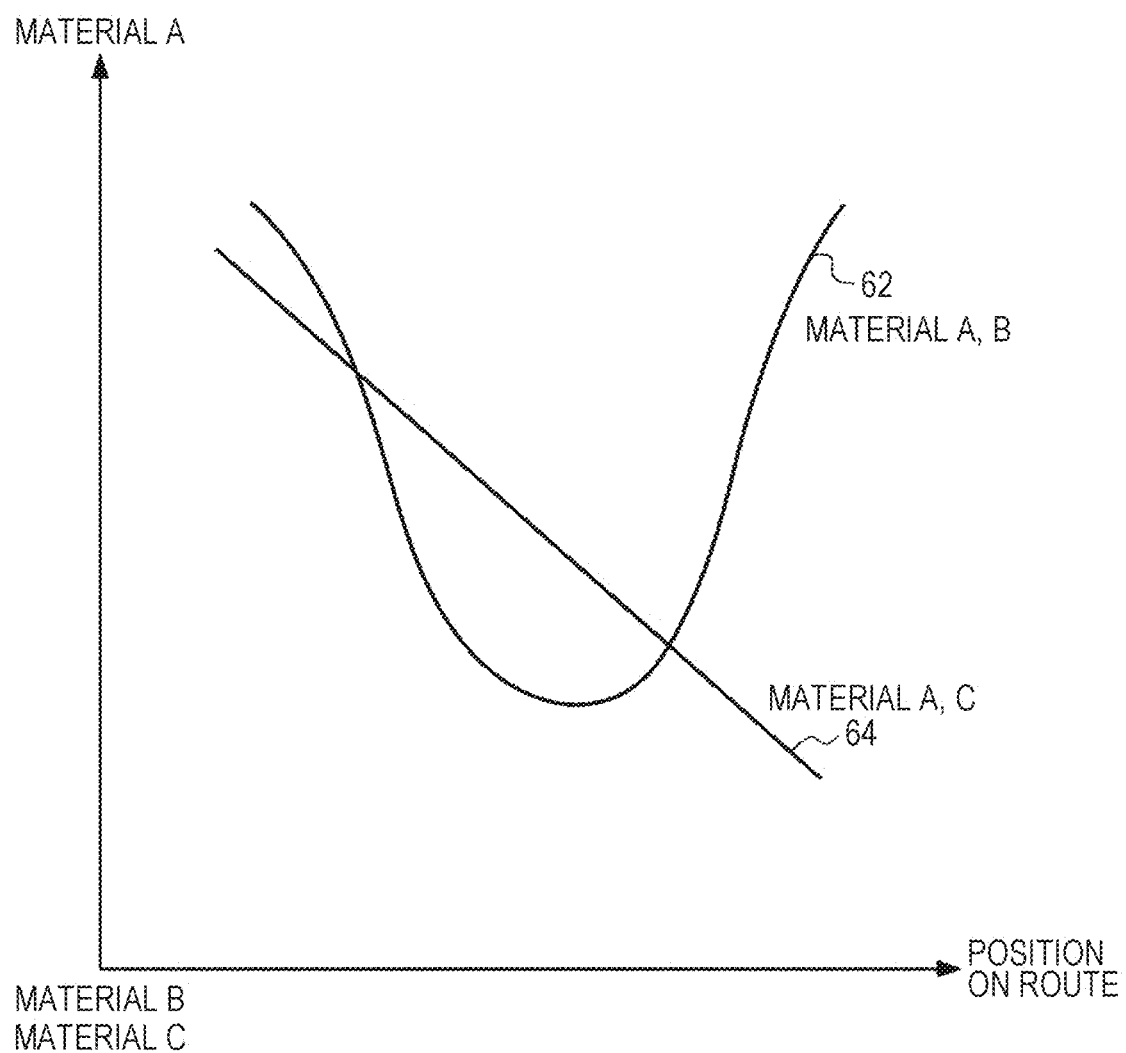
FIG. 16 is a graph illustrating another example of a distribution pattern of materials when a three-dimensional shape is composed of three or more types of materials.

For instance, when the material A, the material B, and the material C are mixed, as an example, as illustrated in FIG. 16, the mixing ratio of each of the material A, the material B, and the material C is determined by using a distribution pattern 62 indicating the mixing ratios of the material A and the material B, and a distribution pattern 64 indicating the mixing ratios of the material A and the material C.

For instance, when the material A is 100% and the material B is 0% according to the distribution pattern 62, and the material A is 100% and the material C is 0% according to the distribution pattern 64, in total, the material A is 200%, the material B is 0%, and the material C is 0%.

In this case, let RA be the total ratio of the material A, RB be the total ratio of the material B, RC be the total ratio of the material C, then $RA_{TOTAL}$ that is the mixing ratio of the material A to the total is calculated by the following Expression (1):

$$RA_{TOTAL} = RA/(RA+RB+RC) \qquad \text{Expression (1)}$$

For instance, when the material A is 80%, the material B is 20% and the material C is 100%, the ratio of the material A to the total, that is, $RA_{\_TOTAL}$ is $80/(80+20+100)=40\%$.

It is to be noted that when three or more types of materials are mixed, for the mixing ratio of each material, a distribution pattern, for which multiple materials are represented by respective different axes, may be defined. For instance, three types of materials are represented by the three axes of three-dimensional rectangular coordinates or polar coordinates, or one axis is divided into multiple regions in parts, and each region serves as an axis for different material.

Figure 17:
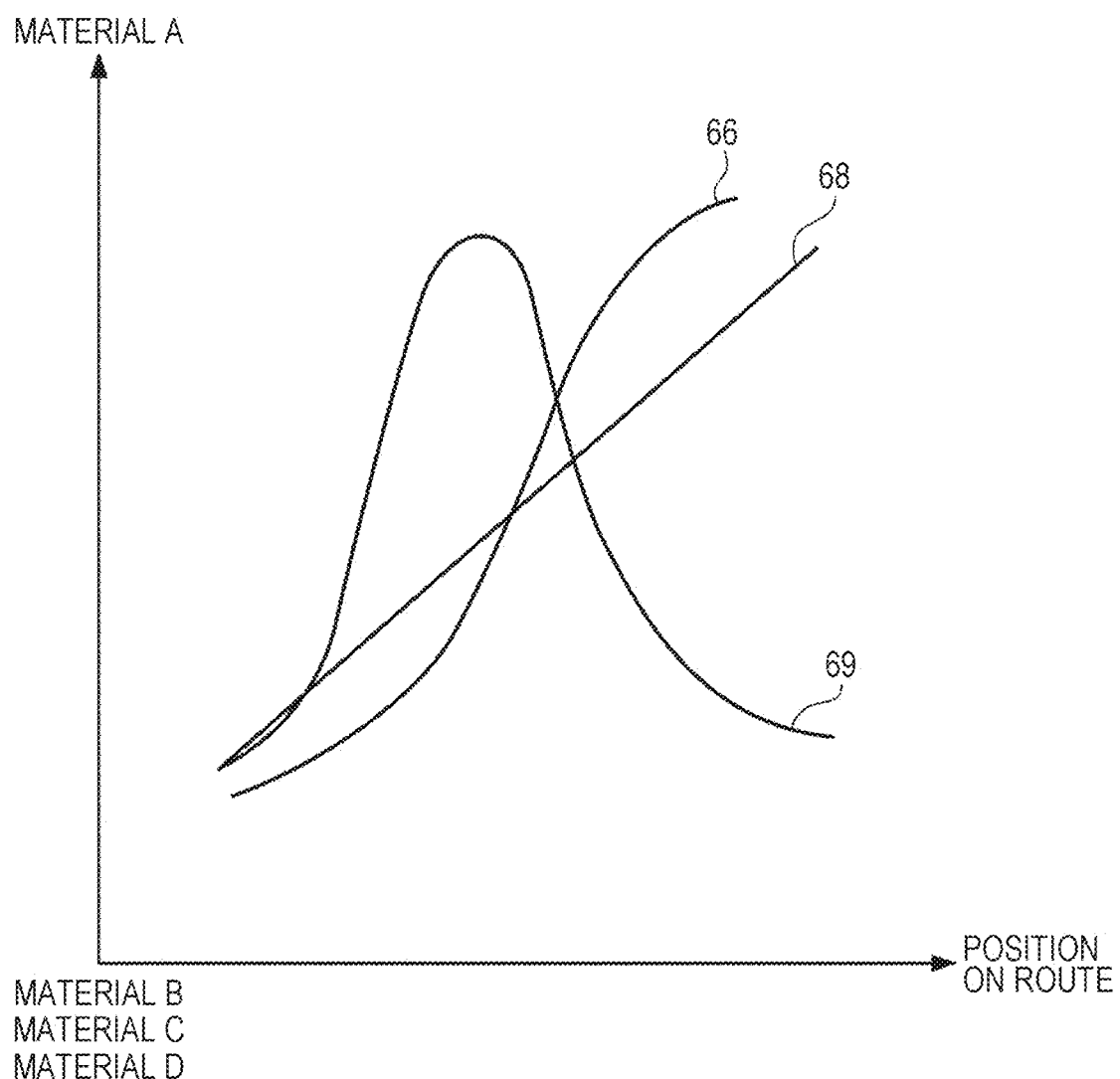
FIG. 17 is a graph illustrating another example of a distribution pattern of materials when a three-dimensional shape is composed of three or more types of materials.

Alternatively, when three or more types of materials are mixed, a distribution pattern indicating the mixing ratio of each material may be expressed by multiple types of distribution patterns. As an example as illustrated in FIG. 17, when the mixing ratio of each of four types of material A, material B, material C, and material D is expressed, a distribution pattern 66 expressing the mixing ratio of the material A and the material B may be a sigmoid function, a distribution pattern 68 expressing the mixing ratio of the material A and the material C may be a linear function (gradation), and a distribution pattern 69 expressing the mixing ratio of the material A and the material D may be a Gaussian distribution. For instance, when the distribution pattern of the material A and the material D is a Gaussian distribution, the mixing ratio of the material A gradually increases, then gradually decreases along the route R. In contrast, when the distribution pattern of the material A and the material C is a linear function with a positive slope, the mixing ratio of the material A gradually increases along the route R. In this manner, a distribution pattern expressing the mixing ratios of three or more types of materials may be created by combining multiple types of distribution patterns.

When three types of the material C, the material D, and material E are mixed, a distribution pattern represented in a three-dimensional space may be used, the three-dimensional space having an axis to represent position on the three-dimensional shape 40, an axis to represent the mixing ratio of each of the material C and the material D, and an axis to represent the mixing ratio of each of the material C and the material E.

Also, in this exemplary embodiment, a case where multiple materials are mixed without taking a combination of materials to be mixed into consideration, has been described, however, without being limited to this, for instance, it is possible to prohibit mixing of a combination of materials which, when placed adjacently, separate from each other.

Also, when the three-dimensional shape 40 is configurated by multiple voxels, the possibility of occurrence of an unintended pattern in the three-dimensional shape 40 is reduced by creating a distribution pattern so that out of the voxels 34 configurating the three-dimensional shape 40, a voxel 34 with the same material does not continue for a predetermined threshold number or longer, or by creating a distribution pattern so that each material has no anisotropy.

Also, when a three-dimensional shape, to which attributes are to be assigned, is not configurated by multiple voxels 34, and a distribution pattern with multiple different attributes is desired to be accurately represented, part or all of the three-dimensional shape, to which attributes are to be assigned, may be voxelized, and the attributes may be assigned to the multiple voxels 34 that configurate at least part of the three-dimensional shape data.

As described above, even for the three-dimensional shape 40 having a complicated shape including heavy or fine, thick or thin, acute or obtuse, and bent or waved shapes, an attribute, such as a color and a material, is assigned to the multiple voxels 34 by a simple operation, as compared with the case where an attribute is assigned to each of the multiple voxels 34 configurating the three-dimensional shape 40. Unlike a three-dimensional shape represented by meshes, in the three-dimensional shape 40 represented by voxels, the boundary between ranges with different mixing ratios does not have to be clearly defined, and a distribution, in which the mixing ratio gradually changes voxel 34 by voxel 34, is created.

Also, a distribution pattern of multiple different attributes to be assigned to a three-dimensional range is more accurately represented by the arrangement of the voxels 34. In addition, a distribution pattern of multiple different attributes to be assigned to a three-dimensional range is represented by information on the voxels only that configurate the three-dimensional shape.

Figure 18A:
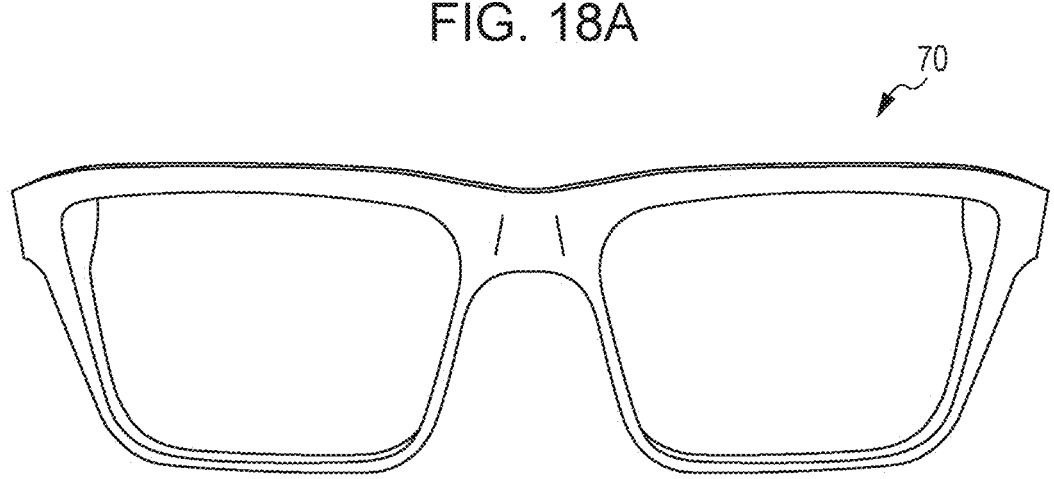
FIG. 18A is a top view illustrating an example of a three-dimensional shape of eyeglasses.
Figure 18B:
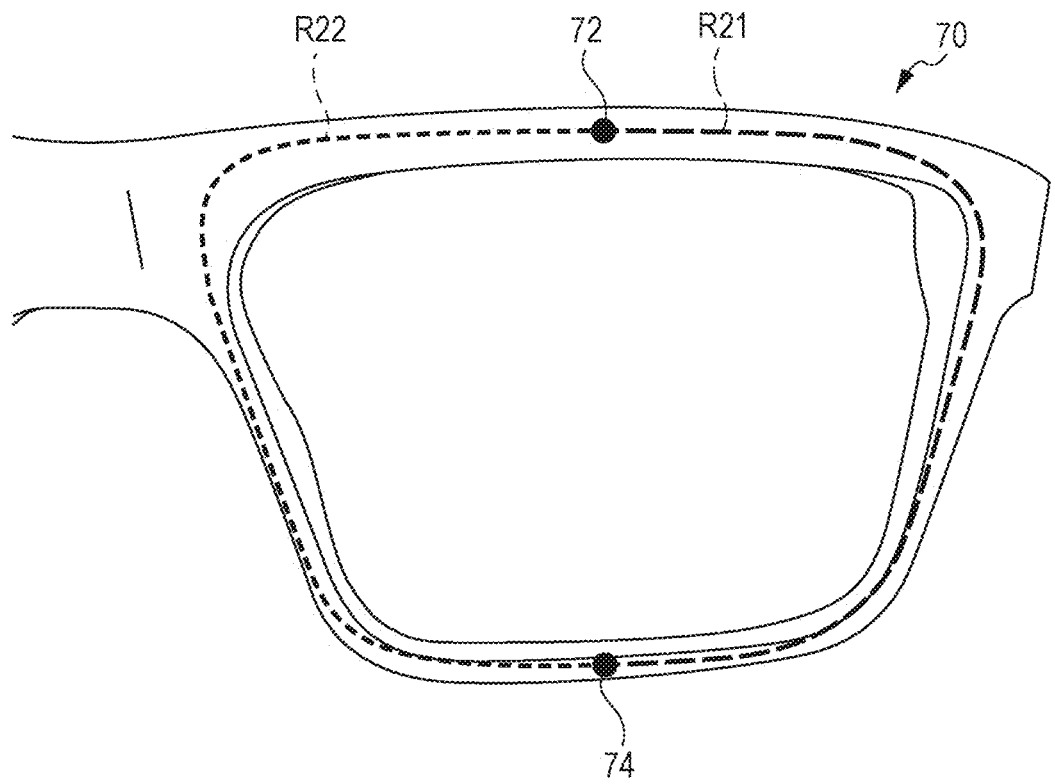
FIG. 18B is an enlarged top view of the three-dimensional shape of the eyeglasses illustrated in FIG. 18A.

FIG. 18A depicts a top view illustrating an example of a three-dimensional shape 70 of the rim of eyeglasses. FIG. 18B depicts an enlarged top view of the three-dimensional shape 70 illustrated in FIG. 18A. As illustrated in FIGS. 18A and 18B, it is assumed that two first characteristic points 72, 74 are set in the curved rim of the eyeglasses. In this case, similar distribution patterns of attributes are set for a clockwise route R21 and a counterclockwise route R22 that include the first characteristic point 72 and the first characteristic point 74 along the curved shape of the rim. Even when the distances of the route R21 and the route R22 are different, relative distribution patterns between the first characteristic points 72 and 74 are set.

Although the present disclosure has been described above using the exemplary embodiment, the present disclosure is not limited to the scope of the exemplary embodiment. Various modifications or improvements may be made to the exemplary embodiment without departing from the gist of the present disclosure, and the exemplary embodiment to which the modifications or improvements are made is also included in the technical scope of the present disclosure.

For instance, the edit processing of three-dimensional shape data illustrated in FIG. 3 may be implemented by hardware such as an application specific integrated circuit (ASIC). In this case, faster processing is achieved as compared with the case where the edit processing is implemented by software.

Also, in the exemplary embodiment, although a case has been described where the editing program for three-dimensional shape data is installed in the ROM 12B, the exemplary embodiment is not limited to this. The editing program for three-dimensional shape data according to the exemplary embodiment of the invention may be provided in the form of computer readable medium. For instance, the editing program according to the exemplary embodiment of the invention may be provided in the form of recording in an optical disk such as a compact disc (CD)-ROM and a digital versatile disc (DVD)-ROM or in a semiconductor memory such as a universal serial bus (USB) memory and a memory card. Also, the editing program for three-dimensional shape data according to the exemplary embodiment of the invention may be obtained from an external device via a communication line connected to the communicator 18.

Also, the order of the steps in the flowchart illustrated in FIG. 3 is not limited to the above-described order. For instance, after the second characteristic point is set, the first characteristic point may be selected, and after a distribution pattern and an attribute are selected, the first characteristic point may be selected.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An editing device for three-dimensional shape data, the editing device comprising:
   at least one hardware processor configured to implement:
      setting at least one first characteristic point on three-dimensional shape data forming a three-dimensional shape;
      setting at least one second characteristic point on a predetermined distribution pattern separate from the three-dimensional shape data, the at least one second characteristic point corresponding to the at least one first characteristic point; and
      assigning an attribute to a three-dimensional range included in at least part of the three-dimensional shape in accordance with the distribution pattern so that the at least one first characteristic point and the at least one second characteristic point correspond to each other,
   wherein the three-dimensional shape is configured by a plurality of voxels,
   wherein the at least one hardware processor is further configured to implement assigning the attribute to the plurality of voxels configurating the at least part of the three-dimensional shape in accordance with the distribution pattern so that the plurality of first characteristic points and the plurality of second characteristic points correspond to each other,
   wherein the at least one hardware processor is further configured to control mixing a combination of materials, and
   wherein the mixing the combination of materials is prohibited when it is determined that the materials are placed adjacently to but separated from each other in the three-dimensional shape data.

2. The editing device for three-dimensional shape data according to claim 1,
   wherein the at least one hardware processor is further configured to implement:
      setting a plurality of first characteristic points including the at least one first characteristic point on the three-dimensional shape data, and
      setting a plurality of second characteristic points including the at least one second characteristic point on the three-dimensional shape data, the plurality of second characteristic points corresponding to the plurality of first characteristic points.

3. The editing device for three-dimensional shape data according to claim 2,
   wherein the at least one hardware processor is further configured to implement assigning the attribute to the three-dimensional range on a route including the plurality of first characteristic points, based on the distribution pattern.

4. The editing device for three-dimensional shape data according to claim 3,
   wherein the at least one hardware processor is further configured to implement assigning the attribute by performing at least one of processing of changing a parameter of the distribution pattern, processing of changing positions of the plurality of second characteristic points on the distribution pattern, and processing of changing positions of the plurality of first characteristic points on the three-dimensional shape data, the plurality of first characteristic points corresponding to the positions of the plurality of second characteristic points on the distribution pattern.

5. The editing device for three-dimensional shape data according to claim 4,
   wherein a number of types of attribute value of the attribute is three or more.

6. The editing device for three-dimensional shape data according to claim 3,
   wherein a number of types of attribute value of the attribute is three or more.

7. The editing device for three-dimensional shape data according to claim 2,
   wherein the at least one hardware processor is further configured to implement assigning the attribute by performing at least one of processing of changing a parameter of the distribution pattern, processing of changing positions of the plurality of second characteristic points on the distribution pattern, and processing of changing positions of the plurality of first characteristic points on the three-dimensional shape data, the plurality of first characteristic points corresponding to the positions of the plurality of second characteristic points on the distribution pattern.

8. The editing device for three-dimensional shape data according to claim 7,
   wherein a number of types of attribute value of the attribute is three or more.

9. The editing device for three-dimensional shape data according to claim 2,
   wherein a number of types of attribute value of the attribute is three or more.

10. The editing device for three-dimensional shape data according to claim 1,
    wherein the at least one hardware processor is further configured to implement assigning the attribute by performing at least one of processing of changing a parameter of the distribution pattern, processing of changing positions of the plurality of second characteristic points on the distribution pattern, and processing of changing positions of the plurality of first characteristic points on the three-dimensional shape data, the plurality of first characteristic points corresponding to the positions of the plurality of second characteristic points on the distribution pattern.

11. The editing device for three-dimensional shape data according to claim 10,
    wherein a number of types of attribute value of the attribute is three or more.

12. The editing device for three-dimensional shape data according to claim 1,
    wherein a number of types of attribute value of the attribute is three or more.

13. The editing device for three-dimensional shape data according to claim 1,
    wherein the types of the attribute include at least one of a color, a strength, a material, and a texture.

14. The editing device for three-dimensional shape data according to claim 1, wherein the at least one hardware processor is further configured to implement setting at least one of the plurality of first characteristic points on the three-dimensional shape data configured by the plurality of voxels, and regards at least one of the plurality of voxels configurating the three-dimensional shape as one of the plurality of first characteristic points, and sets the first characteristic point.

15. The editing device for three-dimensional shape data according to claim 1,
wherein the at least one hardware processor is further configured to implement voxelizing the at least part or all of the three-dimensional shape data such that the three-dimensional shape data is configured by the plurality of voxels, the at least part or all to which the attribute is to be assigned, and assigns the attribute to the plurality of voxels configurating the at least part of the three-dimensional shape data.

16. The editing device according to claim 1,
wherein the predetermined distribution pattern comprises at least one of a linear function, a sigmoid function, a Gaussian function, a sine function and a fractal,
wherein setting the at least one second characteristic point comprises, in response to receiving a user selection of at least one of the linear function, the sigmoid function, the Gaussian function, the sine function and the fractal, setting the at least one second characteristic point on a graphical display of the predetermined distribution pattern which is separate from a display of the three-dimensional shape data.

17. The editing device for three-dimensional shape data according to claim 1,
wherein the at least one hardware processor is further configured to control the three-dimensional shape such that the at least one of the voxels with representing at least one material does not continue for a predetermined threshold distance or longer, or such that the distribution pattern is created so that each of a plurality of materials, including the at least one material, has no anisotropy.

18. A non-transitory computer readable medium storing a three-dimensional shape-data editing program that, when executed, causes a computer to execute a process, the process comprising:
setting at least one first characteristic point on three-dimensional shape data forming a three-dimensional shape;
setting at least one second characteristic point on a predetermined distribution pattern separate from the three-dimensional shape data, the at least one second characteristic point corresponding to the at least one first characteristic point set by the setting of at least one first characteristic point; and
assigning an attribute to a three-dimensional range included in at least part of the three-dimensional shape in accordance with the distribution pattern so that the at least one first characteristic point set in the setting of at least one first characteristic point and the at least one second characteristic point set in the setting of at least one second characteristic point correspond to each other,
wherein the three-dimensional shape is configured by a plurality of voxels,
wherein the process further comprises assigning the attribute to the plurality of voxels configurating the at least part of the three-dimensional shape in accordance with the distribution pattern so that the plurality of first characteristic points and the plurality of second characteristic points correspond to each other,
wherein the process further comprises controlling mixing a combination of materials, and
wherein the mixing the combination of materials is prohibited when it is determined that the materials are placed adjacently to but separated from each other in the three-dimensional shape data.

19. An editing device for three-dimensional shape data, the editing device comprising:
at least one hardware processor configured to implement:
setting at least one first characteristic point on three-dimensional shape data forming a three-dimensional shape;
setting at least one second characteristic point on a predetermined distribution pattern separate from the three-dimensional shape data, the at least one second characteristic point corresponding to the at least one first characteristic point; and
assigning an attribute to a three-dimensional range included in at least part of the three-dimensional shape in accordance with the distribution pattern so that the at least one first characteristic point and the at least one second characteristic point correspond to each other,
wherein the three-dimensional shape is configured by a plurality of voxels,
the at least one hardware processor is further configured to implement assigning an attribute to the plurality of voxels configurating the at least part of the three-dimensional shape in accordance with the distribution pattern so that the plurality of first characteristic points and the plurality of second characteristic points correspond to each other, and
wherein the at least one hardware processor is further configured to control the three-dimensional shape such that the at least one of the voxels with representing at least one material does not continue for a predetermined threshold distance or longer, or such that the distribution pattern is created so that each of a plurality of materials, including the at least one material, has no anisotropy.

* * * * *